United States Patent Office 2,717,854
Patented Sept. 13, 1955

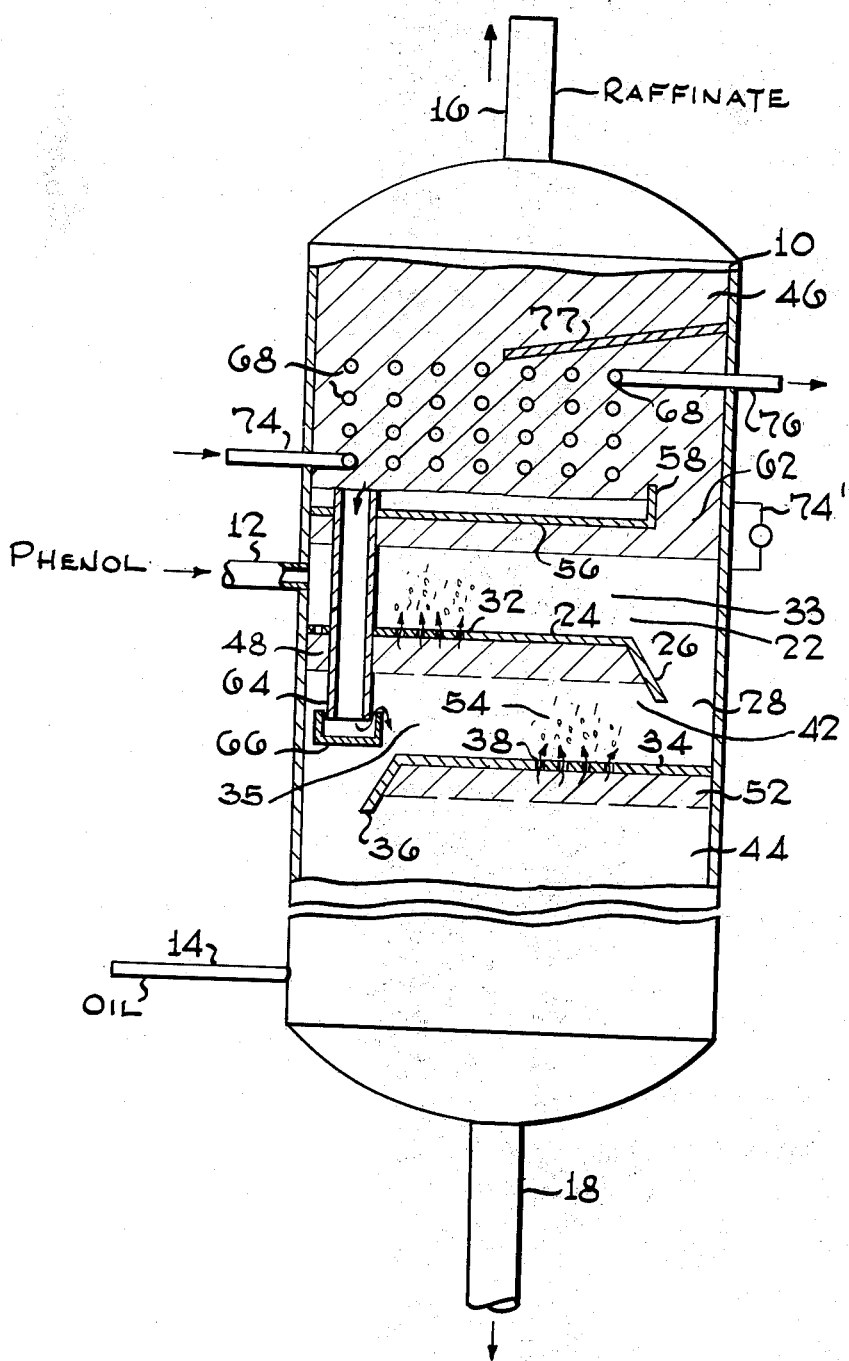

2,717,854

COUNTERCURRENT EXTRACTION TOWER AND METHOD OF EXTRACTING HYDROCARBON OIL WITH PHENOL

James R. Felix, Plainfield, N. J., assignor to Esso Research and Engineering Company, a corporation of Delaware Application November 7, 1952, Serial No. 319,321

7 Claims. (Cl. 196—14.42)

This invention relates to a liquid-liquid extraction tower and more particularly relates to extraction towers for extracting desired hydrocarbon constituents from oils by using a solvent.

In liquid-liquid contacting processes the liquid to be treated is contacted with a substantially immiscible liquid solvent. Various liquid-liquid contacting methods are known in the prior art. In the petroleum refining industry oils are treated with a solvent such as phenol to remove low viscosity index constituents of the oil to obtain a treated oil having an improved viscosity index.

In the phenol extraction of lubricating oil stocks plant operations are frequently limited by phenol circulation capacity. Such a situation may arise, for example, if a plant has an excess of lube feed stock. With this condition maximum production, expressed as oil yield per volume of phenol circulated, is desired for most efficient use of the available phenol circulation capacity. The production may be increased for a given yield if the amount of phenol recirculated is reduced. Such a reduction is currently obtained in some plants by providing cooling and phase separation facilities, external to the extractor tower, for the final raffinate stream. The phenol rich phase thereby recovered is combined with the recirculated phenol stream to the extractor tower. The recirculated phenol rate may then be reduced by the amount of this return. Two disadvantages result from this method of operation:

(a) Additional investment costs are necessary for the heat exchanger, phase separation facilities and return pumps required in the raffinate cooling and settling facilities, and (b) Dilution of the recirculated phenol by the higher oil content, phase separated phenol stream gives some increase in oil content of the solvent entering the top stage of the extractor. This reduces the separation factor, or selectivity (defined as the ratio of "$a$"), the concentration of low viscosity index components in the phenol rich phase divided by their concentration in the raffinate phase, to "$b$," the concentration of high viscosity index components in the phenol rich phase divided by their concentration in the oil phase in this stage and gives raffinate oils of lower quality.

According to the present invention heat exchange means are provided above the top stage of a phenol extractor tower. The raffinate or treated oil leaving the top stage is cooled in flowing over the heat exchange means and the solubility of the phenol in the raffinate or treated oil is reduced and a phenol rich phase is obtained. The phenol rich phase thus separated is allowed to settle on a tray from which it is conducted by gravity flow in a dip leg or downcomer into the phenol stream leaving the next lower extractor stage. The fresh or recirculated phenol stream is mixed in the top stage with the oil passing into the top stage so that mixing of the recirculated phenol stream and the phenol rich phase from the dip leg is prevented. A trap installed at the base of the dip leg or downcomer prevents the raffinate or oil phase being treated in the next stage below the top stage from by-passing the top stage.

According to the present invention the following advantages are obtained:

1. The amount of phenol recirculated, for a given raffinate yield level, is reduced by virtue of the phenol recovered by cooling and phase separation.
2. Investment costs for phase separation facilities and return pumps external to the extraction tower are eliminated.
3. An improved separation factor, defined above, is obtained in the top extraction stage with a resultant quality improvement since the phenol rich phase recovered by cooling is not mixed with the incoming recirculated phenol. The oil content of this phenol is thus kept at the minimum level.

In the drawing, the figure is a partial vertical section of one form of apparatus embodying the present invention.

Referring now to the drawing, the reference character 10 designates a vertical tower provided with an inlet 12 arranged near the upper portion thereof for introducing a solvent liquid which is substantially immiscibble with the feed liquid to be treated and which has a higher density than the liquid to be treated. For treatment of hydrocarbon oils the solvent may be phenol, liquid sulfur dioxide, cresol, nitrobenzene, furfural, aniline and other suitable solvents or a mixture of such solvents. The tower 10 is provided with an inlet pipe 14 near the bottom portion of the tower for the introduction of liquid such as hydrocarbon oil to be treated. The tower 10 also has a top outlet 16 for the raffinate or treated oil. This raffinate or treated oil is sent from tower 10 to a second tower in which the phenol in the oil is removed by distillation. After cooling, the now phenol free, treated oil is suitable for further quality improvement operations, if such are necessary. Tower 10 also has a bottom outlet 18 for the extract or solvent rich liquid. This extract is sent from tower 10 to a third tower in which the phenol is removed by distillation. The phenol from this third tower is combined with the phenol recovered from the raffinate oil in the second tower and this combined phenol flow is returned to tower 10 through inlet 12, after any additional phenol purification that is necessary. The oil being of a lower density than the phenol passes upwardly through the tower whereas the phenol passes downwardly so that countercurrent flow of the two liquids is obtained.

The interior of the tower 10 is provided with trays for effecting mixing of the two liquids in their passage through the tower. The top extractor stage is designated as 22 and is located above tray 24 which is horizontally arranged and extends from the left side of the tower wall in the figure to near the right side of the tower wall in the figure where it is provided with a downwardly sloping portion 26 which has its lower end spaced from the right side of the tower to provide a passageway 28 to permit downward flow of the heavier solvent liquid.

Tray 24 at the left side of the tower in the figure is provided with openings 32 to jet oil into the phenol solvent. The openings 32 are arranged near phenol inlet 12. The rest of tray 24 is imperforate to provide a settling section or zone 33 to permit separation of the phenol and oil being treated. The next lower tray 34 is similar to tray 24 but is arranged to extend from the right side of the tower wall in the figure to near the left side of the tower wall. Tray 34 is also horizontally arranged and provided with a downwardly slanting portion 36 similar to slanting portion 26 on tray 24 but on the opposite side of the tower. Tray 34 adjacent the right side of the wall of the tower in the figure is provided with openings 38 for jetting oil into the phenol solvent but it is to be noted that the openings are arranged inwardly from tower wall and to the left of slanting portion 26 of next higher tray 24. The rest of tray 34 is imperforate to provide a settling zone 35 similar to settling zone 33 above described.

The tower is provided with additional trays below tray 34 in the same alternative or offset relation as exists between trays 24 and 34. The openings 32 and 38 extend entirely across each respective tray from front to back in the figure. The lower trays are also provided with openings similar arranged as openings 32 and 38.

As above noted the reference character 22 designates the top extractor stage. The second or next lower extractor stage is designated 42 and the next lower extractor stage is designated 44. The raffinate phase at the top of the tower above extractor stage 22 is designated 46 and is shown in diagonal shading. Below inlet 12 for phenol, the phenol substantially fills the tower as a continuous phase while the oil to be treated forms a discontinuous phase which builds up under each tray to form a layer and which is also shown by diagonal shading at 48 below tray 24 and at 52 below tray 34. Similar layers of oil will build up under the lower trays (not shown). As there is a difference in the density of the oil and the phenol, there is a pressure differential created which forces the oil through openings 38 in tray 34 and through openings 32 in tray 24. There is a layer of phenol extending from the bottom of the oil layer to the tray in each stage so that small droplets of oil shown at 54 pass upward through the phenol and mix therewith to provide exceedingly good contact. A similar action is produced by the openings 32 in tray 24 and the openings in the other trays (not shown).

Arranged above the top extractor stage 22 is a horizontally extending imperforate tray 56 which extends from the tower wall at the left side of the figure to near the right side of the tower wall in the figure where the tray is provided with an upwardly extending portion or wall 58. The wall 58 is spaced from the adjacent tower wall to form a passageway 62 for upward flow of raffinate or treated oil. The tray 56 and wall 58 extend entirely across the tower from front to back and the tray is associated with a dip leg 64 presently to be described.

Arranged at the left side of the tower in the figure is a dip leg or downcomer 64 which extends from above tray 56 through aligned openings in trays 56 and 24 respectively, to a level above tray 34. The top of the dip leg is at a lower level than the top of wall 58 of the tray 56 so that liquid which collects on tray 56 must flow into and down through dip leg 64 as will be presently described. The bottom of dip leg 64 is provided with a cup-shaped trap 66 spaced from the dip leg to permit downflow of liquid therefrom but to prevent liquid from entering the dip leg from below and passing up through the dip leg.

The raffinate phase leaving top extractor stage 22 contains phenol and according to this invention the raffinate phase leaving the top extractor stage is treated to recover a large portion of the phenol from the raffinate phase and return it to the process thereby reducing the amount of phenol required to be introduced into the tower 10 via inlet line 12.

Positioned above top tray 56 in the raffinate phase 46 are heat exchange tubes 68. These tubes extend from the left hand wall of tower 10 to the right hand side of tray 56, the first right hand vertical row of tubes being just to the left of wall 58. The tubes 68 may be interconnected to form one circuit or only a number of them may be interconnected to form a multiplicity of separate heat exchangers. If the tubes 68 are connected as one unit, an inlet line 74 is provided for introducing a heat exchange medium such as water and an outlet line 76 is provided for removing the heat exchange medium. If a number of tubes 68 are interconnected, separate inlet and outlet connections for the heat exchange medium are supplied for each interconnected set of tubes. A baffle 77 is arranged above the right hand portion of collecting tray 56 and above passageway 62 to cause the raffinate or treated oil from passageway 62 to flow substantially horizontally across heat exchange tubes 68. Baffle 77 extends from the right hand wall of tower 10 to the midpoint of tower 10 and extends from front to rear of tower 10 in the figure and slopes downward from the right hand wall of tower 10 to the midpoint.

In a process where hydrocarbon oil is being extracted with phenol, the heat exchanger functions as a cooler to cool the raffinate phase to reduce the solubility of phenol in the raffinate phase and a phenol rich phase is separated from the raffinate phase. The phenol rich phase thus separated settles and collects on tray 56. The settled phase overflows dip leg 64 and flows by gravity into the phenol stream leaving the second extractor stage 42 so that mixing of the incoming recirculated or fresh phenol stream introduced via inlet 12 with the phenol rich separated phase is prevented.

Interface control means 74 is provided to maintain the interface between the raffinate layer and phenol layer below tray 56 as shown in the drawing. Interface control means 74 can be a mechanical type instrument, as a float which actuates a controlled air supply to a control valve in bottom extract outlet 18, or by electrical means, as with a resistance probe sensitive to the relative lengths of phenol and oil phase bathing its surface and connected to a Wheatstone bridge which in turn can be used to actuate a control valve in bottom extract outlet 18.

As pointed out above, with this invention a reduction in the amount of phenol introduced into the tower is realized while at the same time a raffinate is obtained which contains less phenol.

In the comparison following the oil to be treated has the following inspection.

Gravity, ° API ---------------------------- 21.4
Viscosity (Say.), 100° F ------------------- 463
V. I. ------------------------------------- 35
Refractive index at 20° C ----------------- 1.5121

The amount of phenol used is about 1 part of phenol to 1 part of feed oil by volumes for the case where no cooling is used. Where cooling according to the present invention is used, less phenol treat will be required as shown below in the second column.

|  | No Cooling | Cooling |
|---|---|---|
| Tower Temp., ° F., top/btm | 168/128 | 168/128 |
| Final Raffinate temp., ° F | 168 | [1] 135 |
| Water in phenol, percent | 2.6 | 2.6 |
| Raffinate Quality, V. I | 96 | 96 |
| Treat, vol. percent | 100 | 92 |
| Final Raffinate Yield, percent | 87 | 86.8 |
| Phenol, vol., percent: |  |  |
|   In raffinate to cooler | 21.5 | 21.5 |
|   In raffinate from cooler | 21.5 | 9.1 |
| Phenol recovery from raffinate, percent |  | 64 |

[1] Cooled from 168 to 135 by tower internal cooler.

From the above comparison it will be seen that using the present invention will result in saving about 8% by volume of the phenol treat because this represents about 64% recovery of the phenol from the raffinate. While in the above comparison the phenol contains some water, advantageous results can be obtained with water-free phenol.

The raffinate quality from the two processes above given is essentially the same and is as follows:

Viscosity (Say.), 100° F ------------------- 156
V. I. ------------------------------------- 96
Refractive index at 20° C ----------------- 1.4825

By returning the phenol rich phase from tray 56 to below the top extractor stage 22 rather than to the top extractor stage 22, or, in other words, decreasing the oil content in the phenol fed to the top extractor stage 22 from 2% to 0%, will result in an increase in the product oil viscosity index of from 1 to 2 at the 95 V. I. index for a 168° F. top stage temperature and about 2.5% water in the phenol.

What is claimed is:

1. An apparatus for countercurrent contacting of substantially immiscible liquids of different densities including a vertical tower, a series of superposed trays in said tower, means for introducing a less dense liquid into the lower portion of said tower, means for introducing a more dense liquid, substantially immiscible with said less dense liquid, into an intermediate portion of said tower, said tower being provided with a top outlet for the less dense liquid and a bottom outlet for the more dense liquid, each of said trays being provided with a mixing section and being formed to provide an adjacent settling section, heat exchanger means in the upper portion of said tower for cooling the less dense liquid to separate more dense liquid therefrom, a collecting tray below said cooling means but above the topmost tray for collecting the separated more dense liquid, and means including a dip leg for returning the collected more dense liquid to a lower region in said tower below said means for introducing the more dense liquid into said tower.

2. An apparatus for treating a less dense liquid with a more dense liquid substantially immiscible therewith which includes a vertical tower, means for introducing less dense liquid into the lower portion of said tower, means for introducing more dense liquid into an intermediate portion of said tower, a top outlet for less dense liquid and a bottom outlet for more dense liquid, a series of superposed contacting trays in said tower with the topmost tray being in the region of said means for introducing more dense liquid, a collecting tray spaced above said topmost contacting tray and above the region of said means for introducing more dense liquid, said collecting tray at one side being spaced from the wall of said tower to form a passageway to permit upward flow of less dense liquid, control means for maintaining the interface between the more dense and less dense liquids below said collecting tray, cooling means in said tower above said collecting tray for cooling the less dense liquid to remove dissolved more dense liquid which is then collected on the collecting tray, a downcomer associated with said collecting tray at the side of the tower opposite the side portion of said collecting tray forming said passageway, said downcomer being adapted to receive more dense liquid from said collecting tray, said downcomer extending to a region below said topmost contacting tray to return more dense liquid thereto.

3. An apparatus as defined in claim 2 wherein a baffle is provided above said passageway formed by said collecting tray to direct liquid toward said cooling means.

4. An apparatus including a vertical tower, means for introducing a liquid into an intermediate portion of said tower, means for introducing a liquid into the lower portion of said tower, a top outlet and bottom outlet for liquids, a series of horizontally extending superposed contacting trays in said tower, a horizontally extending collecting tray above the topmost contacting tray and spaced from one side of said tower to form a passageway, heat exchange means in said tower above said collecting tray, dip leg means associated with said collecting tray and extending through said topmost contacting tray for conducting liquid from said collecting tray to the region below the topmost tray.

5. An apparatus according to claim 4 wherein said dip leg means is provided with a bottom sealing means to prevent liquid from flowing in the wrong direction through said dip leg means.

6. An apparatus as defined in claim 4 wherein baffle means are provided above the passageway formed by said collecting tray for directing flow of liquid toward said heat exchange means.

7. In a method for contacting hydrocarbon oil with phenol, wherein said oil is passed upwardly through a contacting zone and a vertical series of contacting regions in said zone, and said phenol is passed downwardly through said contacting regions in substantially countercurrent flow relation to said oil, wherein said oil and phenol are mixed and separated in each region, and wherein initially said oil is introduced into a lower contacting region of said series and said phenol into an upper contacting region of said series, the steps which comprise collecting contacted oil in a separate region in the upper portion of said zone and above the uppermost contacting region therein as said oil is discharged from said uppermost contacting region, cooling said oil in said separate region to reduce the solubility of residual phenol absorbed in said oil separating residual phenol from said oil in said separate region, and discharging said separated phenol from said separate region by gravity flow directly into a contacting region below that contacting region into which said phenol is initially introduced.

References Cited in the file of this patent

UNITED STATES PATENTS

| 1,951,787 | Child et al. | Mar. 20, 1934 |
| 2,025,965 | Whiteley | Dec. 31, 1935 |
| 2,052,196 | Stratford | Aug. 25, 1936 |
| 2,248,220 | Dons et al. | July 8, 1941 |
| 2,623,813 | Strong | Dec. 30, 1952 |